United States Patent
Hoffmann et al.

(10) Patent No.: US 10,332,265 B1
(45) Date of Patent: Jun. 25, 2019

(54) ROBUST RECOGNITION ON DEGRADED IMAGERY BY EXPLOITING KNOWN IMAGE TRANSFORMATION UNDER MOTION

(71) Applicant: HRL Laboratories, LLC, Malibu, CA (US)

(72) Inventors: Heiko Hoffmann, Simi Valley, CA (US); Kyungnam Kim, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 48 days.

(21) Appl. No.: 15/282,915

(22) Filed: Sep. 30, 2016

Related U.S. Application Data (60) Provisional application No. 62/235,212, filed on Sep. 30, 2015.

(51) Int. Cl.
| | |
|---|---|
| *G06K 9/00* | (2006.01) |
| *G06T 7/246* | (2017.01) |
| *G06K 9/46* | (2006.01) |
| *G06T 3/00* | (2006.01) |

(52) U.S. Cl.
CPC .......... *G06T 7/246* (2017.01); *G06K 9/4604* (2013.01); *G06T 3/0056* (2013.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 7,266,220 B2* | 9/2007 | Sato | ............... | G06K 9/00805 340/937 |
| 8,233,660 B2* | 7/2012 | Fritsch | ............... | G06T 7/254 382/103 |
| 9,053,554 B2* | 6/2015 | Uchida | ............... | G06K 9/00805 |
| 9,135,798 B2* | 9/2015 | Sakagami | ............... | G08G 1/166 |
| 9,256,791 B2* | 2/2016 | Stein | ............... | G06K 9/00798 |
| 2008/0002862 A1* | 1/2008 | Matsugu | ............... | G06K 9/00248 382/115 |

(Continued)

OTHER PUBLICATIONS

Wu et al., "Collision sensing by stereo vision and radar sensor fusion", IEEE Transactions on Intelligent Transportation Systems, vol. 10, No. 4, Dec. 2009.*

(Continued)

*Primary Examiner* — Soo Jin Park
(74) *Attorney, Agent, or Firm* — Tope-McKay & Associates (57) ABSTRACT

Described is a system for object detection and recognition from a moving platform under adverse visual conditions. The system generates a predicted change regarding how a moving platform's surrounding change in an image captured from the moving platform. Based on an agreement of the predicted change and an actual input image obtained via an image sensor positioned on the moving platform and corrupted by a visual disturbance, a transformation-consistency map is generated. The transformation-consistency map and the actual input image are used to improve detection and recognition performance of a machine learning method in detecting at least one object in the moving platform's surroundings.

18 Claims, 6 Drawing Sheets

(56) References Cited

U.S. PATENT DOCUMENTS

| | | | | |
|---|---|---|---|---|
| 2010/0183192 A1* | 7/2010 | Fritsch | ............... | G06T 7/254 382/103 |
| 2012/0140061 A1* | 6/2012 | Zeng | ............... | G01S 13/726 348/135 |
| 2014/0063248 A1* | 3/2014 | Sakagami | ............... | G08G 1/166 348/148 |
| 2014/0161323 A1* | 6/2014 | Livyatan | ............... | G06T 3/0093 382/107 |

OTHER PUBLICATIONS

Talukder et al., "Real-time detection of moving objects from moving vehicles using dense stereo and optical flow", IROS 2004.*

Lin et al., "Deep learning of spatio-temporal features with geometric-based moving point detection for motion segmentation", 2014 ICRA, Jun. 2014.*

P. Viola and M.J. Jones. Rapid Object Detection Using a Boosted Cascade of Simple Features. IEEE Conference on Computer Vision and Pattern Recognition (CVPR), 2001, pp. I-511-I-518.

R. Lienhart and J. Maydt. An Extended Set of Haar-Like Features for Rapid Object Detection. IEEE ICIP 2002, vol. 1, pp. 900-903, 2002.

N. Dalai and B. Triggs. Histograms of Oriented Gradients for Human Detection. IEEE Conference on Computer Vision and Pattern Recognition (CVPR), vol. II, pp. 886-893, 2005.

P. Felzenszwalb, R. Girshick, D. McAllester and D. Ramanan. Object Detection with Discriminatively Trained Part-Based Models. PAMI, vol. 32, No. 9, 2010, pp. 1627-1645.

J. Engel, T. Schöps, D. Cremers. LSD-SLAM: Large-Scale Direct Monocular SLAM. In European Conference on Computer Vision (ECCV), 2014, Part II, LNCS 8690, pp. 834-849.

A. Angelova, A. Krizhevsky, V. Vanhoucke. Pedestrian Detection with a Large-Field-of-View Deep Network, ICRA, 2015, pp. 704-711.

R. Wu, S. Yan, Y. Shan, Q. Dang and G. Sun. Deep Image: Scaling Up Image Recognition. arXiv preprint arXiv:1501.02876, 2015, pp. 1-8.

H. Bay, T. Tuytelaars, L. Van God. SURF: Speeded Up Robust Features, Proceedings of the ninth European Conference on Computer Vision, ECCV 2006, Part I, LNCS 3951, pp. 404-417.

Simonyan, Karen, and Andrew Zisserman. "Very deep convolutional networks for large-scale image recognition." arXiv preprint arXiv:1409.1556(2014), pp. 1-14.

* cited by examiner

ROBUST RECOGNITION ON DEGRADED IMAGERY BY EXPLOITING KNOWN IMAGE TRANSFORMATION UNDER MOTION

CROSS-REFERENCE TO RELATED APPLICATIONS

This is a Non-Provisional patent application of 62/235,212, filed in the United States on Sep. 30, 2015, entitled, "Robust Recognition on Degraded Imagery by Exploiting Known Image Transformation Under Motion," the entirety of which is hereby incorporated by reference.

BACKGROUND OF INVENTION (1) Field of Invention

The present invention relates to a system for object recognition and, more particularly, to a system for object recognition on degraded imagery.

(2) Description of Related Art

The prior art for object detection and recognition has been dominated by approaches that extract features, such as edges or gradients, from an image without taking into account how the image was generated through three-dimensional-two-dimensional (3D-2D) projection. For example, many current methods for object detection are based on the Haar Feature-based Cascade Classifiers (see List of incorporated Literature References, Literature Reference Nos. 1 and 2), Histograms of Oriented Histograms (see Literature Reference No. 3), or Deformable Parts Model (see Literature Reference No. 4). Such approaches are sensitive to structural noise that deviates from Gaussian noise.

Deep learning, particularly, convolutional neural networks (see Literature Reference Nos. 6 and 7) have shown the best performance for object recognition. However, these techniques can also fail in the presence of structural noise.

Thus, a continuing need exists for a method of object recognition that uses information regarding ego-motion of the camera and the relative velocity of the surroundings and objects to estimate the expected transformation in the camera image to avoid the effects of structural noise.

SUMMARY OF INVENTION

The present invention relates to a system for object recognition and, more particularly, to a system for object recognition on degraded imagery. The system comprises one or more processors and a memory having instructions such that when the instructions are executed, the one or more processors, perform multiple operations The system generates a predicted change regarding how a moving platform's surroundings change in an image captured from the moving platform. Based on an agreement of the predicted change and an actual input image, a transformation-consistency map is generated. The actual input image is obtained via an image sensor positioned on the moving platform and is corrupted by at least one visual disturbance. The transformation-consistency map and the actual input image are used to detect and recognize at least one object in the moving platform's surroundings.

In another aspect, the predicted change is generated using input from a motion sensor positioned on the moving platform and an estimate of a velocity of the at least one object.

In another aspect, a radar sensor positioned on the moving platform provides data regarding presence of the at least one object and its location and/or velocity in the moving platforms' surroundings, and wherein the motion sensor provides a three-dimensional (3D) velocity vector of the moving platform and a 3D rotational velocity of the moving platform, wherein given the 3D velocity vector and the 3D rotational velocity, a relative velocity of the moving platform's surroundings is determined, wherein the relative velocity is used in generating the prediction.

In another aspect, the system estimates ego-motion of the image sensor positioned on the moving platform, wherein the ego-motion defines a six degree-of-freedom velocity of the moving platform, and wherein the estimated ego-motion is used in generating the transformation-consistency map.

In another aspect, the transtbrmation-consistency map represents a confidence regarding how well a change in a region of the actual input image agrees with the predicted change.

In another aspect, the transformation-consistency map constrains a region of the actual input image over which the at least one object is detected.

Finally, the present invention also includes a computer program product ant a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for object recognition and, more particularly, to a system for object recognition on degraded imagery. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects.

Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph. 6.

Before describing the invention in detail, first a list of incorporated literature references as used in the description is provided. Next, a description of various principal aspects of the present invention is provided. Finally, specific details of the present invention are provided to give an understanding of the specific aspects.

(1) List of Incorporated Literature References

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. P. Viola and M. J. Jones, Rapid Object Detection Using a Boosted Cascade of Simple Features. IEEE Conference on Computer Vision and Pattern Recognition (CVPR), 2001.

2. R. Lienhart and J. Maydt. An Extended Set of Haar-Like Features for Rapid Object Detection. IEEE ICIP 2002, Vol. 1, pp. 900-903, 2002.

3. N. Dalal and B. Triggs. Histograms of Oriented Gradients for Human Detection. IEEE Conference on Computer Vision and Pattern Recognition (CVPR), vol. II, pgs, 886-893, 2005.

4. P. Felzenszwalb, R. Girshick, D. McAllester and D. Ramanan. Object Detection with Discriminatively Trained Part-Based Models, PAMI, 2010.

5. J. Engel, T. Schops, D. Cremers. LSD-SLAM: Large-Scale Direct Monocular SLAM. In European Conference on Computer Vision (ECCV) 2014.

6. A. Angelova, A. Krithevsky, V. Vanhoucke. Pedestrian Detection with a Large-Field-of-View Deep Network, ICRA, 2015.

7. R. Wu, S. Yan, Y. Shan, Q. Dang and G. Sun. Deep Image: Scaling Up Image Recognition. arXiv preprint arXiv: 1501.02876, 2015.

8. H. Bay, T. Tuytelaars, L. Van Gool. SURF: Speeded Up Robust Features, Proceedings of the ninth European Conference on Computer Vision, May 2006.

(2) Principal Aspects

Various embodiments of the invention include three "principal" aspects. The first is a system for object recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
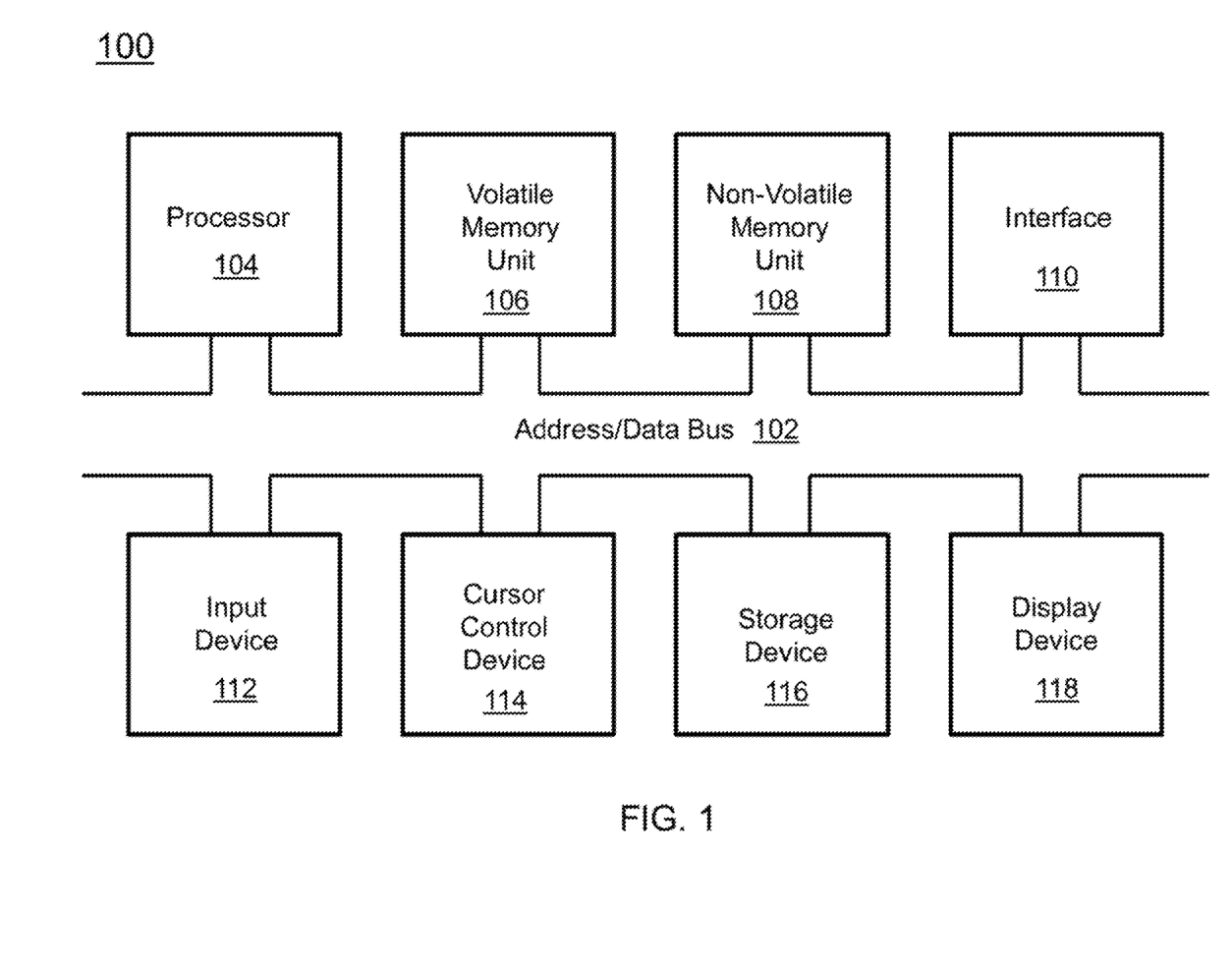
FIG. 1 is a block diagram depicting the components of a system for object recognition according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user, The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance, with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
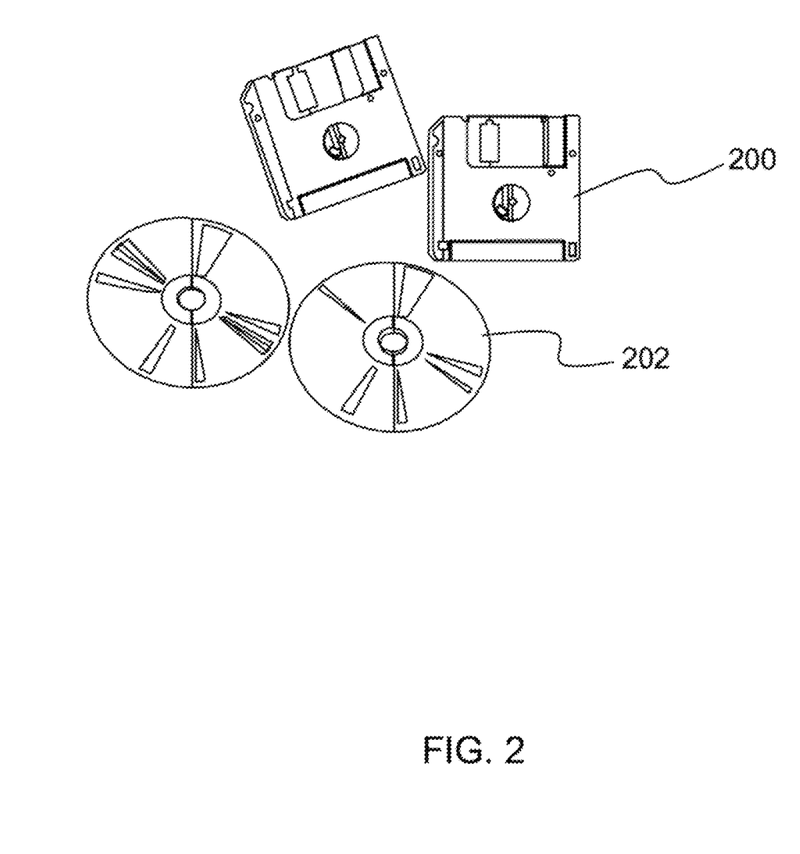
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described herein is a method to detect and recognize objects, such as vehicles and pedestrians, from a moving platform. A non-limiting example of a moving platform is a vehicle (e.g., car or unmanned aerial vehicle). The system according to some embodiments of the present disclosure uses the input of the moving platform's motion sensor and estimates of the velocity of surrounding obstacles to compute a prediction about how the surroundings change in a video camera image on the moving platform. Based on the agreement of this prediction with the actual video input, a computer processor computes a transformation consistency map, which reflects across the image the confidence regarding how well a change in an image region agrees with the expected change of the surroundings under motion of the platform.

In a following operation, a computer processor uses the transformation consistency map and the image data as an input to a deep learning network to detect and recognize objects within the image. Significantly, the invention 1) uses a self-motion estimate to compute a transformation consistency map, and 2) uses this transformation consistency map as additional input for a deep learning network. One purpose of the invention described herein is to improve the detection and recognition of objects in situations when the sensory input is corrupted by disturbances or nuisances (e.g., heavy rain, sun glare, snow, dirt). An advantage of the system according to embodiments of this disclosure is that it takes the generation of the sensory input into account for uncovering task-relevant information hidden in the sensory input. The transformation consistency map is used to improve detection and reduce false alarms.

Figure 3:
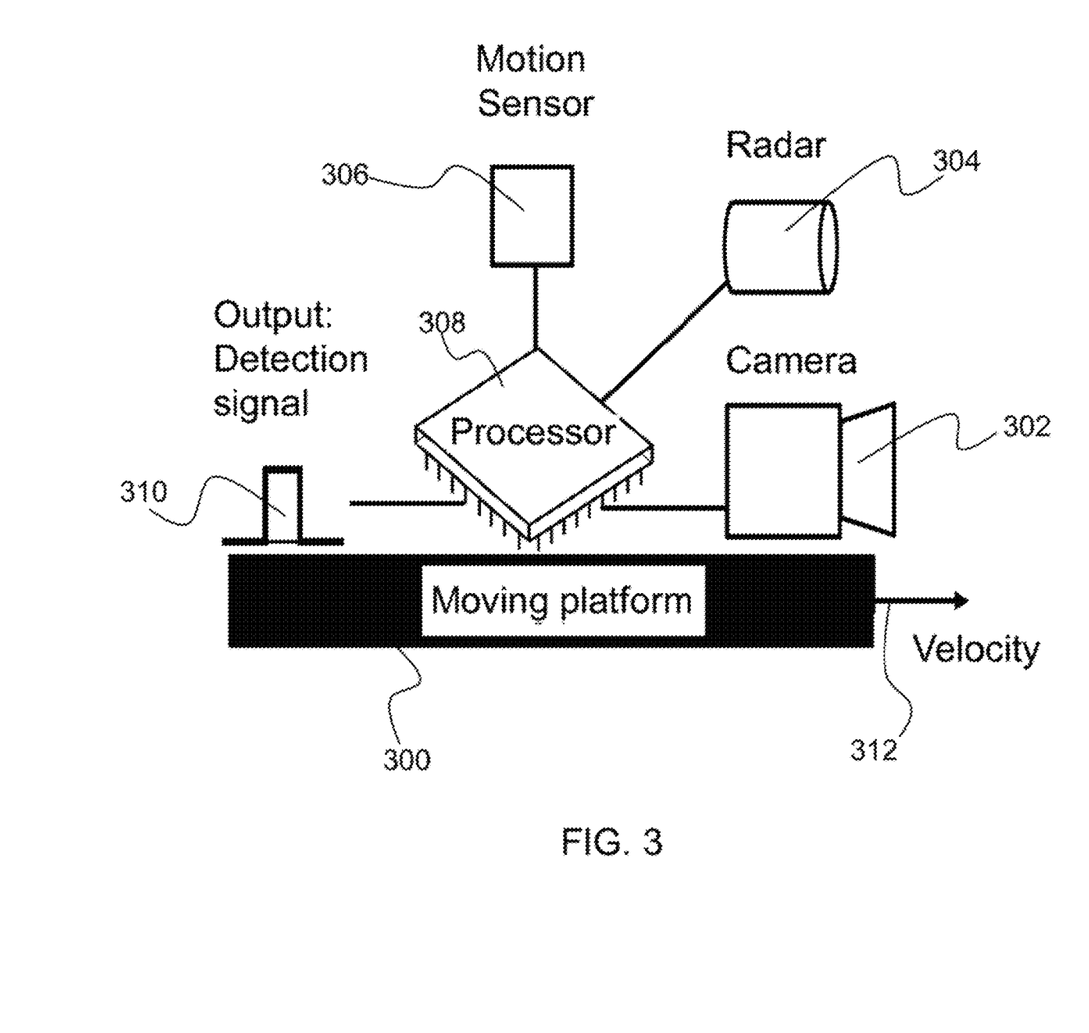
FIG. 3 is an illustration of components of a system for object recognition according to some embodiments of the present disclosure.

A significant purpose of the present invention is to improve the detection and recognition of objects (e.g., other vehicles, pedestrians, or obstacles on the road), as observed from a moving platform. FIG. 3 depicts an embodiment of the present invention. A moving platform 300 contains a video camera 302, a radar sensor 304, at least one motion sensor 306, and a processor 308 to integrate and process the signals from these sensors. The output of the processor 308 is a detection signal 310 (giving information about what the object is and where the object is within the image), which may also contain the confidence value of the detection. The following steps describe how the detection signal is obtained.

The radar sensor 304 provides information regarding the presence of objects and their location and velocities in the three-dimensional (3D) surroundings of the moving platform 300. The motion sensor 306 (i.e., any mechanism or device that can provide velocity of the platform) provides the 3D velocity vector of the platform 312 as well as its 3D rotational velocity. Given the velocity of the platform 312, one knows the relative velocity of the static surroundings as observed through the camera 302. A non-limiting example to estimate the relative velocity (and xyz-location) of an object tracked over time through its visual features is described in Literature Reference No. 5. To estimate the location of surrounding objects, the features on an object are extracted using a feature extractor (such as the Speeded Up Robust Features (SURF) as described in Literature Reference No. 8). With more observations of the same features over time, their depth values are estimated using a SLAM (simultaneous localization and mapping) method, as described in Literature Reference No. 5, and become more reliable over time. Hence, their xyz-location estimation becomes better. An obstacle's (object's) relative velocity can be, thus, estimated using those features on the obstacle.

Figure 4:
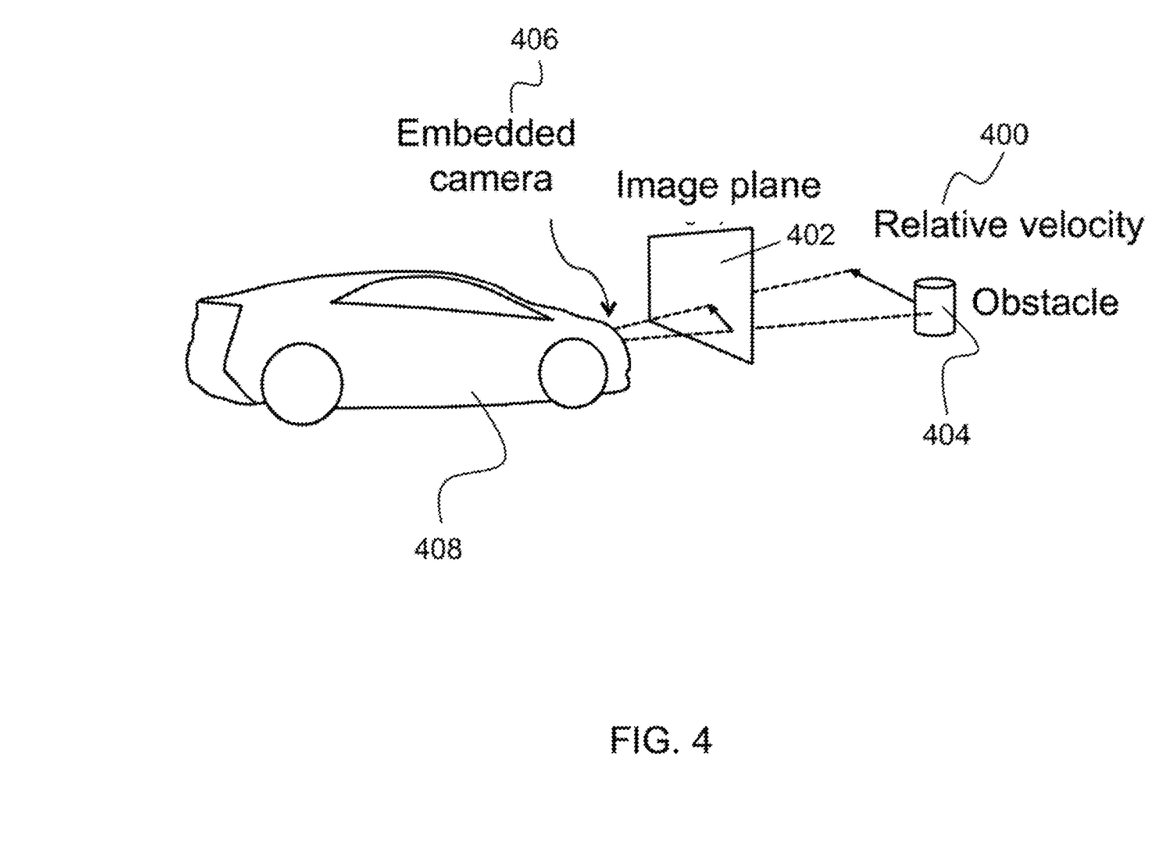
FIG. 4 is an illustration of a geometric relationship between the relative velocity of an obstacle and the optical flow on the image plane according to some embodiments of the present disclosure.

One embodiment of the invention is to use the relative velocity 400 of the surroundings and objects to compute the expected optical flow in the image plane 402, as shown in FIG. 4, which illustrates the geometric relationship between the relative velocity 400 of an obstacle 404 and the optical flow on the image plane 402. This geometric relationship allows predicting the change in the appearance of the obstacle 404 within the image, given an estimate of the obstacle's 404 position and velocity. To compute the expected optical flow, the relative velocity 400 is projected onto the image plane 402 at the location of the projected position of the obstacle 404. This projection refers to perspective projection in Euclidean geometry. Based on the optical flow, the expected change of the image can be predicted (e.g., by deforming an obstacle according to the optical flow vectors that originate from the boundary of the obstacle).

The predicted change of the image is compared against the actual input (current image) at the corresponding time point. The actual input is obtained, for instance, via an embedded camera 406 on a vehicle 408. A non-limiting example of this comparison is to compute the squared error between predicted and actual input for each pixel value. This error can be converted into a probability using, for example, a Gaussian function (e.g., $p_{xy}=\exp(-\|o_{xy}-c_{xy}\|^2/\sigma$, where xy are the image coordinates, o is the actual input, c is the predicted input, and σ is a suitably chosen constant). It is desirable to compute a smoothing filter over this probability array to average across local regions within an image. A non-limiting example for this smoothing is using a Gaussian blur filter, which uses a Gaussian function for a weighted average over neighboring pixels. Since this probability is defined across the image, it is, called the transformation-consistency map. It provides, for each pixel, the confidence regarding how well it corresponds with the expected change under transformation due to motion of the platform.

Figure 5:
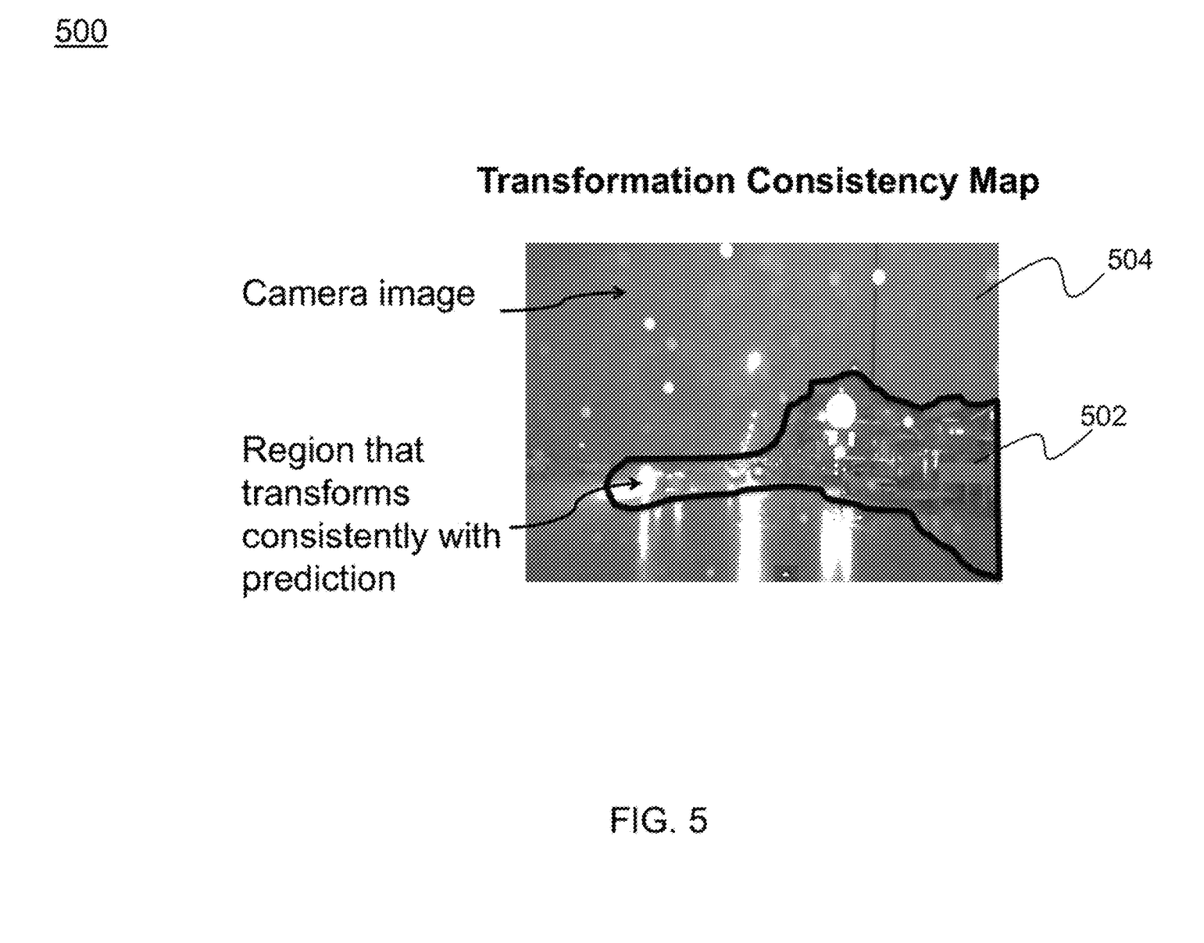
FIG. 5 is an illustration of a transformation-consistency reap according to some embodiments of the present disclosure.

FIG. 5 illustrates a transformation-consistency map 500, which shows the region 502 within a camera image 504 that transforms consistent with the expected 3D projection of the world, The region 502 surrounded by the black curve is an area where the image 504 transforms as expected from the self-motion of the platform. Outside this region 502, the change of pixels is inconsistent with the self-motion. For example, the region of the image 504 containing droplets on the windshield does not transform as expected from static objects in front of the car. Therefore, any detection method (e.g., convolutional neural networks, see Literature Reference No. 6) should put a low weight (i.e., low confidence) for recognizing objects within this inconsistent region.

In another operation, the transformation-consistency map, together with the input image, is used as an input to a deep learning method. The deep learning method detects and recognizes objects within the image. One embodiment of a deep learning method is a convolutional neural network (CNN) (see Literature Reference Nos. 6 and 7 for a description of CNNs). The CNN-based approach uses a selective search to extract many image regions that likely contain objects, and evaluates the convolutional neural network trained with many sample images of object categories of interest (e.g., cars, pedestrians). This processing pipeline of search-and-classify is a commonly used way of object detection/recognition (see, e.g., Literature Reference Nos. 6 and 7). To avoid duplicate detected objects, a single object is selected with the maximum score (from the CNN output) within a search window. The entire image can also be exhaustively scanned for object recognition at multiple scales without selective searching, The input of the transformation-consistency map according to embodiments of the present disclosure can be used in the following ways: 1) to constrain the image region over which the CNN is computed to constrain the area of detection, and 2) as an input to the CNN parallel to each pixel, such that the CNN learns to ignore pixels with low $p_{xy}$ value, which corresponds to pixels that are inconsistent under the image-change prediction due to ego-motion.

Figure 6:
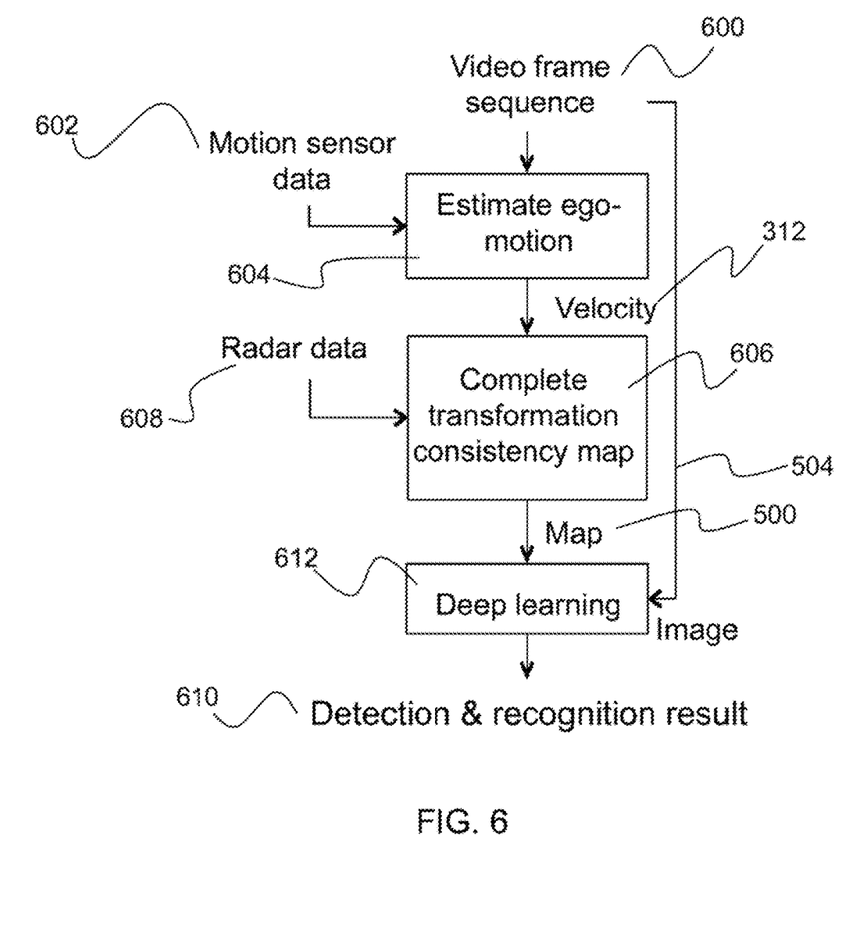
FIG. 6 is a flow diagram illustrating a process flow for recognition and detection according to some embodiments of the present disclosure.

FIG. 6 illustrates the process flow for recognition and detection according to embodiments of the invention. First, based on a video frame sequence 600 (obtained with a video camera) and motion sensor data 602, the ego-motion 604 of the platform is estimated, as described above. Alternatively, the ego-motion 604 may be estimated based only on the video frame sequence 600 or only on the motion sensor data 602. The ego-motion 604 defines the 6 degree-of-freedom velocity 312 of the platform (6=3 degrees of translation+3 degrees of rotation). Given this velocity 312, the transformation-consistency map is computed (element 606) by quantifying how the predicted change of the image (estimated from the geometric relationship between the relative velocity of an obstacle (e.g., traffic cone) and the optical flow on the image plane (see FIG. 4) is consistent with the actual input. The image areas affected by nuisance factors, such as rain, sun-glare, dirt, or snow, will not likely follow this consistent transformation, so lower consistency values would be generated for these image areas. In addition, radar data 608 may be used to improve the estimate of the transformation-consistency map (element 606). Radar may be more reliable than vision for estimating depth and velocity in the depth direction, but has poor angular resolution. So it may augment vision to improve the estimate of location and velocity of the surrounding objects. These estimates are the basis for computing the transformation-consistency map, as described above. Finally, the resulting transformation-consistency map 500 together with the corresponding image 504 is used for a detection and recognition result 610 through a deep learning method 612.

In one embodiment, the transformation-consistency map constrains the area of the actual input image over which objects are detected (i.e., the area is limited to pixels for which $p_{xy}$ is above a threshold). In another embodiment, the transformation-consistency map is an additional input to the machine learning method deep learning network) in parallel to the image input.

The invention described herein provides a key functionality for active safety and autonomous driving functions in a car. The system could, for instance, expand the operating envelope of autonomous lane following in cars. Further, the invention can be used to improve sensing for ISR (intelligence, surveillance, reconnaissance) applications, particularly, for autonomous operations of unmanned aerial vehicles (UAVs). Additionally, the system according to embodiments of the present disclosure can improve sensing under adverse conditions and, thus, create a competitive advantage by expanding the envelope of autonomous operations.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detecting and recognizing objects from a moving platform, the system comprising:
one or more processors and a non-transitory computer-readable medium having executable instructions encoded thereon such that when executed, the one or more processors perform operations of:
generating a predicted change regarding how a moving platform's surroundings change in an image captured from the moving platform;
based on an agreement of the predicted change and an actual input image, generating a transformation-consistency map, wherein the actual input image is obtained via an image sensor positioned on the moving platform and is corrupted by at least one visual disturbance; and
detecting and recognizing at least one object in the moving platform's surroundings by combining the actual input image with the transformation-consistency map to form an input for a deep learning method,
wherein the transformation-consistency map is used as the input to the deep learning method parallel to each pixel in the actual input image, such that the deep learning method learns to ignore pixels in the actual input image that are inconsistent under the predicted change due to ego-motion of the image sensor.

2. The system as set forth in claim 1, wherein the predicted change is generated using input from a motion sensor positioned on the moving platform and an estimate of a velocity of the at least one object.

3. The system as set forth in claim 2, wherein a radar sensor positioned on the moving platform provides data regarding presence of the at least one object and its location and/or velocity in the moving platforms' surroundings, and wherein the motion sensor provides a three-dimensional (3D) velocity vector of the moving platform and a 3D rotational velocity of the moving platform, wherein given the 3D velocity vector and the 3D rotational velocity, a relative velocity of the moving platform's surroundings is determined, wherein the relative velocity is used in generating the prediction.

4. The system as set forth in claim 1, wherein the one or more processors further perform an operation of estimating ego-motion of the image sensor positioned on the moving platform, wherein the ego-motion defines a six degree-of-freedom velocity of the moving platform, and wherein the estimated ego-motion is used in generating the transformation-consistency map.

5. The system as set forth in claim 1, wherein the transformation-consistency map represents a confidence regarding how well a change in a region of the actual input image agrees with the predicted change.

6. The system as set forth in claim 1, wherein the transformation-consistency map constrains a region of the actual input image over which the at least one object is detected.

7. A computer-implemented method for detecting and recognizing objects from a moving platform, comprising:
an act of causing one or more processors to execute instructions stored on a non-transitory memory such that upon execution, the one or more processors perform operations of:
generating a predicted change regarding how a moving platform's surroundings change in an image captured from the moving platform;
based on an agreement of the predicted change and an actual input image, generating a transformation-consistency map,
wherein the actual input image is obtained via an image sensor positioned on the moving platform and is corrupted by at least one visual disturbance; and
detecting and recognizing at least one object in the moving platform's surroundings by combining the actual input image with the transformation-consistency map to form an input for a deep learning method,
wherein the transformation-consistency map is used as the input to the deep learning method parallel to each pixel in the actual input image, such that the deep learning method learns to ignore pixels in the actual input image that are inconsistent under the predicted change due to ego-motion of the image sensor.

8. The method as set forth in claim 7, wherein the predicted change is generated using input from a motion sensor positioned on the moving platform and an estimate of a velocity of the at least one object.

9. The method as set forth in claim 8, wherein a radar sensor positioned on the moving platform provides data regarding presence of the at least one object and its location and/or velocity in the moving platforms' surroundings, and wherein the motion sensor provides a three-dimensional (3D) velocity vector of the moving platform and a 3D rotational velocity of the moving platform, wherein given the 3D velocity vector and the 3D rotational velocity, a relative velocity of the moving platform's surroundings is determined, wherein the relative velocity is used in generating the prediction.

10. The method as set forth in claim 7, wherein the one or more processors further perform an operation of estimating ego-motion of the image sensor positioned on the moving platform, wherein the ego-motion defines a six degree-of-freedom velocity of the moving platform, and wherein the estimated ego-motion is used in generating the transformation-consistency map.

11. The method as set forth in claim 7, wherein the transformation-consistency map represents a confidence regarding how well a change in a region of the actual input image agrees with the predicted change.

12. The method as set forth in claim 7, wherein the transformation-consistency map constrains a region of the actual input image over which the at least one object is detected.

13. A computer program product for detecting and recognizing objects from a moving platform, the computer program product comprising:
  computer-readable instructions stored on a non-transitory computer-readable medium that are executable by a computer having one or more processors for causing the processor to perform operations of:
  generating a predicted change regarding how a moving platform's surroundings change in an image captured from the moving platform;
  based on an agreement of the predicted change and an actual input image, generating a transformation-consistency map,
  wherein the actual input image is obtained via an image sensor positioned on the moving platform and is corrupted by at least one visual disturbance; and
  detecting and recognizing at least one object in the moving platform's surroundings by combining the actual input image with the transformation-consistency map to form an input for a deep learning method,
  wherein the transformation-consistency map is used as the input to the deep learning method parallel to each pixel in the actual input image, such that the deep learning method learns to ignore pixels in the actual input image that are inconsistent under the predicted change due to ego-motion of the image sensor.

14. The computer program as set forth in claim 13, wherein the predicted change is generated using input from a motion sensor positioned on the moving platform and an estimate of a velocity of the at least one object.

15. The computer program product as set forth in claim 14, wherein a radar sensor positioned on the moving platform provides data regarding presence of the at least one object and its location and/or velocity in the moving platforms' surroundings, and wherein the motion sensor provides a three-dimensional (3D) velocity vector of the moving platform and a 3D rotational velocity of the moving platform, wherein given the 3D velocity vector and the 3D rotational velocity, a relative velocity of the moving platform's surroundings is determined, wherein the relative velocity is used in generating the prediction.

16. The computer program as set forth in claim 13, wherein the one or more processors further perform an operation of estimating ego-motion of the image sensor positioned on the moving platform, wherein the ego-motion defines a six degree-of-freedom velocity of the moving platform, and wherein the estimated ego-motion is used in generating the transformation-consistency map.

17. The computer program as set forth in claim 13, wherein the transformation-consistency map represents a confidence regarding how well a change in a region of the actual input image agrees with the predicted change.

18. The computer program as set forth in claim 13, wherein the transformation-consistency map constrains a region of the actual input image over which the at least one object is detected.

* * * * *